United States Patent
Hughes et al.

(10) Patent No.: US 9,393,917 B2
(45) Date of Patent: Jul. 19, 2016

(54) METHOD FOR OPERATING A DRIVER ASSISTANCE SYSTEM WITH AN ELECTRONIC REARVIEW MIRROR, DRIVER ASSISTANCE SYSTEM AND MOTOR VEHICLE

(71) Applicant: Connaught Electronics Ltd., Tuam, County Galway (IE)

(72) Inventors: Ciarán Hughes, Kinvara (IE); Myles Friel, Letterkenny (IE); Jonathan Horgan, Killarney (IE)

(73) Assignee: Connaught Electronics Ltd., Tuam, County Galway (IE)

( * ) Notice: Subject to any disclaimer, the term of this patent is extended or adjusted under 35 U.S.C. 154(b) by 0 days.

(21) Appl. No.: 14/699,119

(22) Filed: Apr. 29, 2015

(65) Prior Publication Data

US 2015/0314736 A1 Nov. 5, 2015

(30) Foreign Application Priority Data

Apr. 30, 2014 (DE) .......................... 10 2014 106 035

(51) Int. Cl.
*H04N 7/18* (2006.01)
*G06G 7/78* (2006.01)
(Continued)

(52) U.S. Cl.
CPC ................. *B60R 11/04* (2013.01); *B60R 1/081* (2013.01); *H04N 7/18* (2013.01); *B60R 2300/8026* (2013.01)

(58) Field of Classification Search
CPC .......... G08G 1/16; G08G 1/163; B60R 11/04; B60R 2300/108
See application file for complete search history.

(56) References Cited

U.S. PATENT DOCUMENTS 5,289,321 A 2/1994 Secor
5,949,331 A 9/1999 Schofield et al.
(Continued)

FOREIGN PATENT DOCUMENTS

DE 19816054 A1 10/1998
DE 29908072 U1 8/1999
(Continued)

OTHER PUBLICATIONS

Broggi, Alberto, "Multi-Resolution Vehicle Detection Using Artificial Vision", 2004 IEEE Intelligent Vehicles Symposium, University of Parma, Parma, Italy, Jun. 14-17, 2004 (5 pages).
(Continued)

*Primary Examiner* — Dave Czekaj
*Assistant Examiner* — Tsion B Owens
(74) *Attorney, Agent, or Firm* — Osha Liang LLP

(57) ABSTRACT

A method for operating a driver assistance system of a motor vehicle is provided. A first image sequence of a first rear environmental region of the motor vehicle is provided by a first camera system of an electronic rearview mirror and the first image sequence is displayed on a display device of the electronic rearview mirror disposed in an interior of the motor vehicle. Furthermore, a second image sequence of a second environmental region of the motor vehicle, which overlaps with the first environmental region at least in certain areas, is provided by a second camera system of an environmental capturing device. The electronic rearview mirror is then checked for presence of a malfunction by a computing device of the driver assistance system and the second image sequence is displayed on the display device of the electronic rearview mirror when the malfunction is present.

11 Claims, 2 Drawing Sheets

Figure 1:
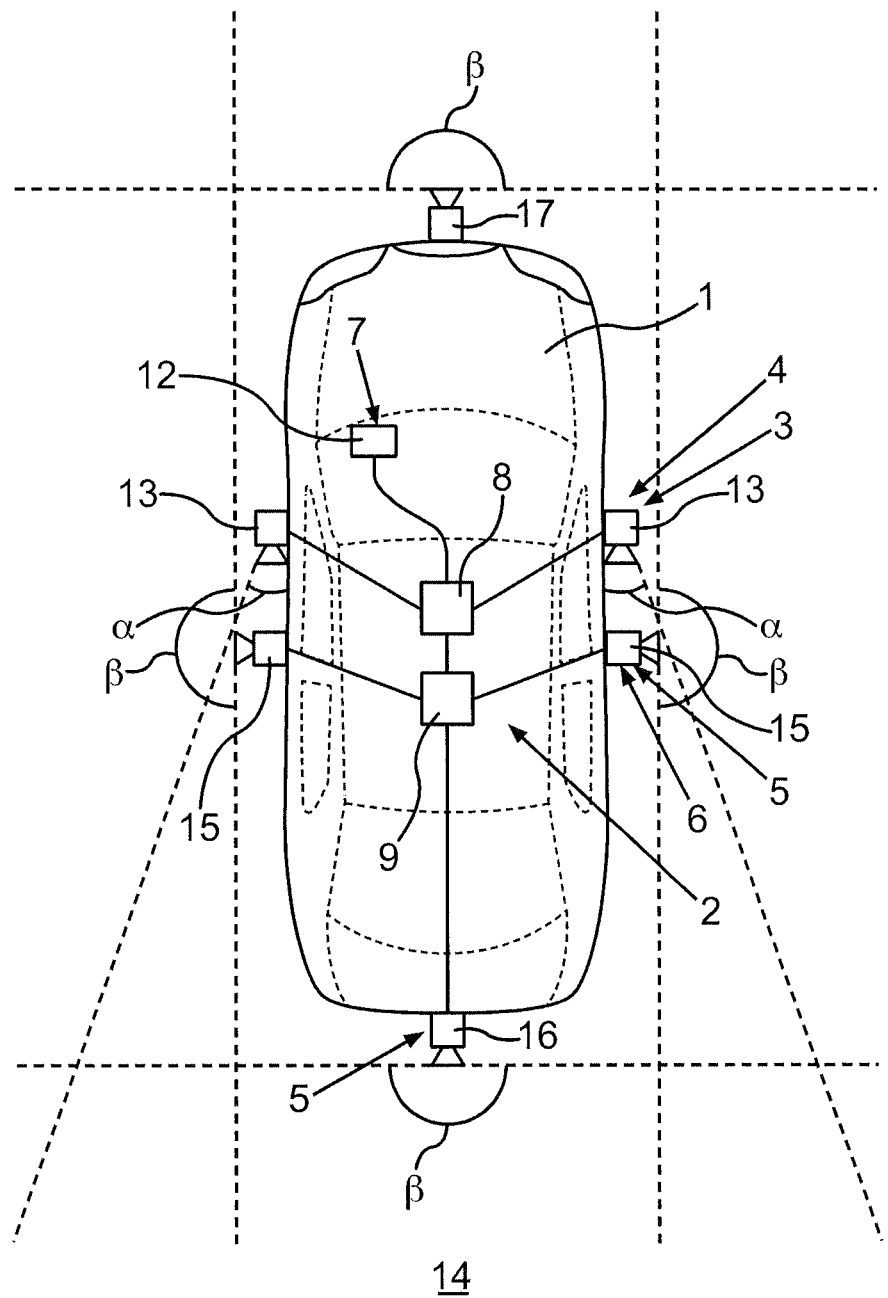

(51) Int. Cl.
B60R 11/04 (2006.01)
B60R 1/08 (2006.01)

(56) References Cited

U.S. PATENT DOCUMENTS

| | | | |
|---|---|---|---|
| 6,424,273 B1 | 7/2002 | Gutta et al. | |
| 6,553,130 B1 | 4/2003 | Lemelson et al. | |
| 7,817,021 B2* | 10/2010 | Date | B60R 1/00 340/438 |
| 7,859,565 B2 | 12/2010 | Schofield et al. | |
| 8,386,114 B2 | 2/2013 | Higgins-Luthman | |
| 8,543,330 B2 | 9/2013 | Taylor et al. | |
| 8,643,724 B2* | 2/2014 | Schofield | B60R 1/00 348/113 |
| 9,019,090 B2* | 4/2015 | Weller | B60R 1/12 340/425.5 |
| 9,041,806 B2* | 5/2015 | Baur | B60R 1/00 340/903 |
| 2004/0164228 A1 | 8/2004 | Fogg et al. | |
| 2005/0270500 A1 | 12/2005 | Ito | |
| 2008/0266396 A1 | 10/2008 | Stein | |
| 2012/0233841 A1 | 9/2012 | Stein | |
| 2013/0229522 A1* | 9/2013 | Schofield | B60C 23/00 348/148 |
| 2014/0043483 A1 | 2/2014 | Schuder et al. | |
| 2014/0085471 A1 | 3/2014 | Han | |
| 2014/0354815 A1* | 12/2014 | Hughes | G08G 1/163 348/148 |
| 2015/0343950 A1* | 12/2015 | Heinemann | B60R 1/00 348/148 |

FOREIGN PATENT DOCUMENTS

| | | |
|---|---|---|
| DE | 102007013400 A1 | 10/2008 |
| DE | 102008042012 A1 | 3/2010 |
| DE | 102010023199 A1 | 2/2011 |
| DE | 102010020201 A1 | 5/2011 |
| EP | 0513476 A1 | 11/1992 |
| EP | 1302365 A2 | 4/2003 |
| EP | 2731828 B1 | 12/2014 |
| JP | S59114139 A | 7/1984 |
| JP | S64-14700 A | 1/1989 |
| JP | H2-36417 B2 | 8/1990 |
| JP | H02-117935 U | 9/1990 |
| JP | 3-99952 A | 4/1991 |
| JP | H0730149 U | 6/1995 |
| WO | 2015052314 A1 | 4/2015 |

OTHER PUBLICATIONS

Kastrinaki, V. "A Survey of Video Processing Techniques for Traffic Applications", Image and Vision Computing 21, Digital Image and Signal Processing Laboratory, Department of Electronics and Computing Engineering, Technical University of Crete, Chania, Greece, accepted Jan. 15, 2003, pp. 359-381 (23 pages).

Extended European Search Report issued in corresponding European Application No. 15163509.1 dated Oct. 12, 2015 (8 pages).

Burkard, Wadenweber et al., "Automotive Lighting and Human Vision" In: "Automotive Lighting and Human Vision", Sep. 28, 2007, Springer, XP55216379, ISBN: 978-3-54-036696-6, pp. 23-28, (7 pages).

European Search Report issued in corresponding European Application No. 15165159, dated Sep. 3, 2015 (2 pages).

* cited by examiner

METHOD FOR OPERATING A DRIVER ASSISTANCE SYSTEM WITH AN ELECTRONIC REARVIEW MIRROR, DRIVER ASSISTANCE SYSTEM AND MOTOR VEHICLE

The invention relates to a method for operating a driver assistance system of a motor vehicle. A first image sequence of a first, rear environmental region of the motor vehicle is provided by means of a first camera system of an electronic rearview mirror and the first image sequence is displayed on a display device of the electronic rearview mirror disposed in an interior of the motor vehicle. Furthermore, a second image sequence of a second environmental region of the motor vehicle overlapping with the first environmental region at least in certain areas is provided by means of a second camera system of an environmental capturing device. In addition, the invention relates to a driver assistance system for a motor vehicle with a first camera system of an electronic rearview mirror and a second camera system of an environmental capturing device, which is formed for performing such a method. Furthermore, the invention also relates to a motor vehicle with such a driver assistance system.

Driver assistance systems for motor vehicles, which provide an image sequence of a rear environmental region of the motor vehicle by means of a camera system and present the image sequence on a display device in the interior of the motor vehicle, are already known from the prior art. Such systems are also referred to as electronic rearview mirror. By such an electronic rearview mirror, the usually used exterior mirrors and/or the rearview mirror can be replaced. In this context, from EP 0513476 A1, a display system for a motor vehicle is known, in which an image sequence of the environmental region is captured with a camera system and it is displayed on one or more displays in the interior of the motor vehicle.

Furthermore, from the printed matter U.S. Pat. No. 5,289,321, a camera system and a display system are known. The camera system can have several cameras disposed at the outside of the motor vehicle. The rear environmental region of the motor vehicle is captured with the cameras and displayed on the display system. Therein, the display system can have three separate displays.

In addition, from DE 299 08 072 U1, a monitor rearview device for motor vehicles is known. In this case, the monitor rearview device provides a camera attached to each side of the motor vehicle as well as a camera attached to the rear of the vehicle in order to display an image sequence of the cameras from the rear environmental region on the display device in the interior of the motor vehicle. It is also provided that upon engaging a reverse gear of the motor vehicle, it is changed from the laterally attached cameras to the camera disposed on the rear of the motor vehicle and thus the image sequence of the camera attached to the rear of the motor vehicle is displayed on the display device.

Moreover, from the prior art, environmental capturing devices are known, which capture an environmental region by means of a camera system. These environmental capturing devices, which are also referred to as Surround View Systems (SVS), are adapted to capture the environmental region in the immediate vicinity of the motor vehicle as completely as possible. Such environmental capturing devices are mostly composed of several cameras, which are disposed on the motor vehicle such that the environmental region is provided as completely as possible or over-completely by overlap of fields of view of the respective camera. Herein, the cameras are for example disposed on respective sides of the motor vehicle and/or on the rear of the motor vehicle and/or on a front of the motor vehicle. Furthermore, such cameras are often employed in these environmental capturing devices, which include a lens, by which a large field of view can be captured. Herein too, it is usually provided to present the image sequences of the cameras on a display device.

It is the object of the invention to demonstrate a solution, how in a driver assistance system of the initially mentioned kind, the rear environmental region of the motor vehicle can be particularly reliably captured and displayed to the vehicle occupants.

According to the invention, this object is solved by a method, by a driver assistance system as well as by a motor vehicle having the features according to the respective independent claims. Advantageous implementations of the invention are the subject matter of the dependent claims, of the description and of the figures.

A method according to the invention serves for operating a driver assistance system of a motor vehicle. A first image sequence of a first, rear environmental region of the motor vehicle is provided by means of a first camera system of an electronic rearview mirror and the first image sequence is displayed on a display device of the electronic rearview mirror disposed in an interior of the motor vehicle. Furthermore, a second image sequence of a second environmental region of the motor vehicle, which overlaps with the first environmental region at least in certain areas, is provided by means of a second camera system of an environmental capturing device. According to the invention, it is provided that the electronic rearview mirror is checked for presence of a malfunction by means of a computing device of the driver assistance system and the second image sequence is displayed on the display device of the electronic rearview mirror if the malfunction is present.

The invention is based on the realization that upon presence of the malfunction of the electronic rearview mirror, usually, replacement is not provided. However, the electronic rearview mirror provides information required for a safe operation of the motor vehicle. With the first camera system of the electronic rearview mirror, the environmental region of the motor vehicle can be captured, which the driver otherwise can perceive with the aid of the exterior mirrors and/or the rearview mirror of the motor vehicle. The image data of this first environmental region is presented on one or more display devices of the motor vehicle.

In addition, the motor vehicle is equipped with the environmental capturing device, which can also be referred to as Surround View System. The environmental capturing device includes a second camera system, which is adapted to capture a larger field of view than the first camera system of the electronic rearview mirror. The second environmental region, which is captured with the second camera system of the environmental capturing device, can completely or partially encompass the first environmental region captured with the first camera system of the electronic rearview mirror.

Now, it is provided that upon presence of a malfunction of the electronic rearview mirror, the second image sequence of the environmental capturing device is displayed on the display device. In other words, upon failure of the electronic rearview mirror, the image data captured with the second camera system of the environmental capturing device is presented on the display device of the electronic mirror. Thus, the environmental region, in particular a rear environmental region of the motor vehicle, can further be displayed to the driver. In this manner, the safety in operation of the motor vehicle can be increased.

In an embodiment, it is provided that a respective image of the second image sequence is transformed by means of an image processing device of the second camera system such that the second environmental region is presented on the display device in undistorted manner. For example, this can be allowed in that calibration data, in particular an interior and an exterior orientation, of the camera system is present. The transformation now entails the advantage that a driver of the motor vehicle can better interpret the second image sequence displayed on the display device. In this transformation, for example, the image substantially showing a lateral region of the motor vehicle can be varied such that the rear environmental region of the motor vehicle originally only present at the edge of the image now is better recognizable. Additionally or alternatively, other biases or distortions can be removed from the image by the transformation.

In a further embodiment, a partial area of the respective images of the second image sequence is selected by the image processing device, which substantially corresponds to the first environmental region. This means that if for example the first environmental region only corresponds to the rear environmental region of the motor vehicle and the second environmental region substantially corresponds to a side view, then the partial area can be selected from the second image sequence, which corresponds to the rear environmental region. It is in turn advantageous that only this partial area can be displayed on the display device and the interpretation of the image is facilitated to the driver of the motor vehicle. Thus, the driver does not or only to low extent have to adjust himself if the image data of the environmental capturing device is presented on the display device of the electronic rearview mirror.

Preferably, the partial area is transformed by means of the image processing device such that it is presented on the display device in undistorted manner. Hereby, on the one hand, the advantage arises that the partial area is selected and thus a confusing lateral region of the motor vehicle is not displayed, but only for example the rear environmental region. On the other hand, this partial area can be presented in undistorted manner. This also results in increased safety because the driver can better and faster interpret the displayed partial area than if it is present in distorted manner.

In further development, the presence of the malfunction is checked by means of the computing device by measuring a data flow from the first camera system to the display device. With the computing device, it can be checked if the electronic rearview mirror is functional. For this purpose, it can be checked if a current image of the first camera system is displayed on the display device or if the data flow is interrupted. Alternatively or additionally, it can be checked if an elder image of the first camera system is displayed on the display device and the display is thus frozen. It is also possible that no image at all is displayed on the display device. The computing device can for example include a watchdog unit monitoring the data flow. Now, an advantage is in that thereby it can be very accurately determined if a malfunction of the electronic rearview mirror is present.

In particular, it is provided that the second image sequence is displayed on the display device during the presence of the malfunction, and otherwise the first image sequence is again displayed on the display device. It can be provided that the second image sequence is only temporarily displayed on the display device. If it is determined that the data flow is again faultless, it can again be switched to the first camera system. Now, it is advantageous in that thereby always that image sequence with the best image quality or that image sequence presenting the rear environmental region particularly precisely is used for display on the display device. Since the second camera system is not primarily adapted to particularly precisely provide the rear environmental region, a more accurate or higher quality presentation of the rear environmental region can be effected by the first camera system.

In a further development, it is provided that the presence of the malfunction is checked by means of the computing device upon start-up of the motor vehicle. This means that for example upon activating the ignition, the data flow is checked and in case of the malfunction, it is switched to the second camera system and thus the second image sequence is displayed on the display device. The advantage is in that high safety in driving the motor vehicle can be ensured thus just at the start-up.

Furthermore, it is advantageous if the presence of the malfunction is checked at predetermined points of time during an operation of the motor vehicle by means of a computing device. This has the advantage that occurrence of the malfunction during the operation of the motor vehicle can be contemporarily noticed and a countermeasure—thus switching to the second image sequence—can be initiated. Furthermore, the regular check by means of the computing device also increases the safety in the operation of the motor vehicle.

A driver assistance system according to the invention for a motor vehicle is formed for performing a method according to the invention. The driver assistance system includes a first camera system of an electronic rearview mirror and a second camera system of an environmental capturing device. The driver assistance system is preferably adapted to switch from a display of a first image sequence of the first camera system to a display of a second image sequence of the second camera system on a display device of the motor vehicle.

Preferably, it is provided that the second camera system includes at least one lateral camera, which is adapted to capture substantially a region situated laterally next to the motor vehicle. This has the advantage that the lateral camera can mainly be used to capture a lateral environmental region of the motor vehicle and is used for display on the display device only in case of presence of a malfunction of the first camera system.

Additionally or alternatively, it is provided that the at least one lateral camera has a fish eye lens. The fish eye lens designates a special lens, which has a very large angle of view, mostly 180°, or even greater. Straight lines, which do not pass through the image center, are imaged in curved manner with such a lens. The fish eye lens has the advantage that although for example the region situated laterally next to the motor vehicle is substantially captured, a rear environmental region of the motor vehicle and/or a front environmental region of the motor vehicle can be additionally captured.

A further development provides that the second camera system includes at least one rearview camera, which is adapted to capture substantially a region situated behind the motor vehicle. The rearview camera is often adapted to assist in parking procedures and thus provides an image of the near rear environmental region of the motor vehicle. However, it can also be possible that the image of this rearview camera is used to capture the rear environmental region of the motor vehicle, which is farther away from the motor vehicle. This has the advantage that a camera of the second camera system can be used with the rearview camera, which is able to provide the rear environmental region without or with less severe distortions than the lateral camera, because the rear environmental region is closer to the optical axis of the rearview camera.

A motor vehicle according to the invention, in particular a passenger car, includes the driver assistance system according to the invention.

The preferred embodiments presented with respect to the method according to the invention and the advantages thereof correspondingly apply to the driver assistance system according to the invention as well as to the motor vehicle according to the invention.

Further features of the invention are apparent from the claims, the figures and the description of figures. All of the features and feature combinations mentioned above in the description as well as the features and feature combinations mentioned below in the description of figures and/or shown in the figures alone are usable not only in the respectively specified combination, but also in other combinations or else alone.

Now, the invention is explained in more detail based on a preferred embodiment as well as with reference to the attached drawings.

Figure 2:
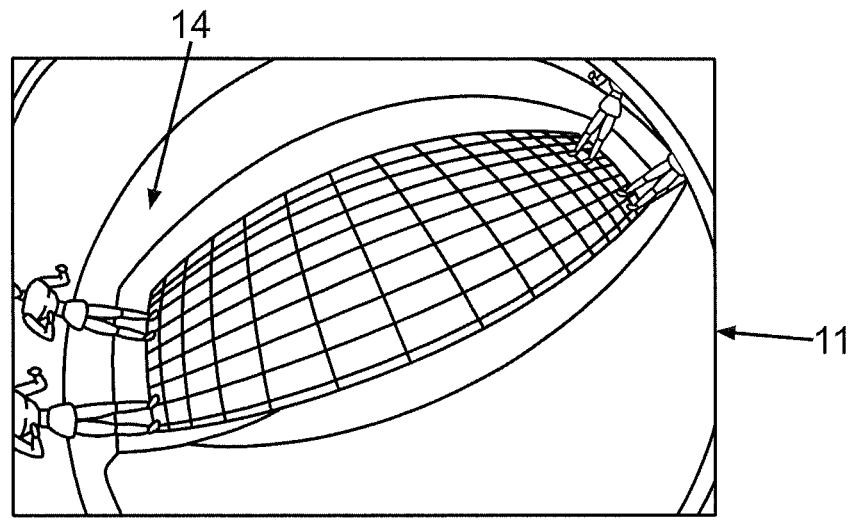
Figure 3:
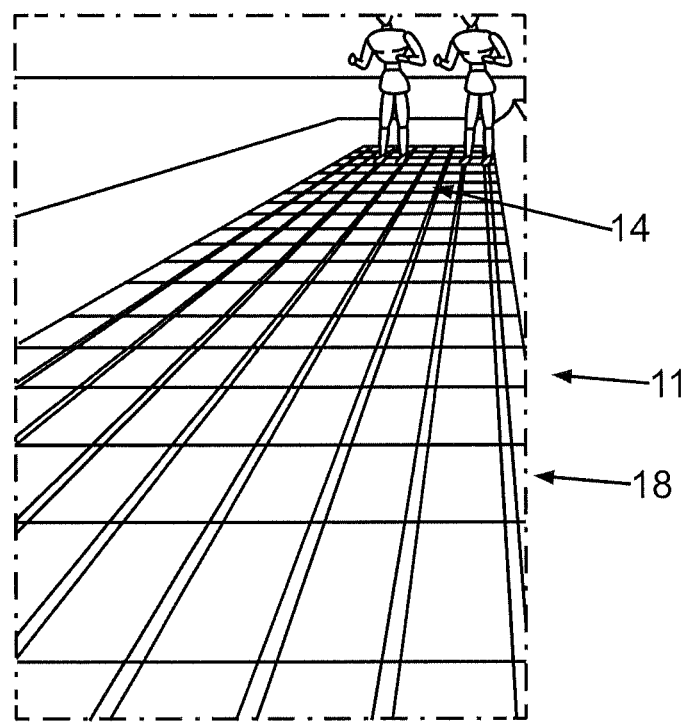

There show:

FIG. 1 in schematic illustration a plan view of a motor vehicle with a driver assistance system according to an embodiment of the invention;

FIG. 2 in schematic illustration an image of a second image sequence provided by a lateral camera of a second camera system; and FIG. 3 in schematic illustration a partial area of the image, which was transformed to present a rear environmental region of the motor vehicle in undistorted manner.

In FIG. 1, a plan view of a motor vehicle 1 according to an embodiment of the invention is illustrated in schematic illustration. The motor vehicle 1 is a passenger car in the present embodiment. The motor vehicle 1 has a driver assistance system 2, which includes a first camera system 3 of an electronic rearview mirror 4 and a second camera system 5 of an environmental capturing device 6. The electronic rearview mirror 4 is also known under the term eMirror. Furthermore, the driver assistance system 2 includes a display device 7 of the electronic rearview mirror 4 disposed in an interior of the motor vehicle 1 and a computing device 8.

In addition, the second camera system 5 has an image processing device 9, which is also connected to the display device 7 via the computing device 8. However, it can also be provided that the image processing device 9 or the second camera system 5 is directly connected to the display device 7. Generally, each possible connection is conceivable, which allows that a first image sequence of the first camera system 3 and/or a second image sequence 11 of the second camera system 5 can be displayed on the display device 7.

The display device 7 includes at least one screen 12, which is for example formed as a liquid crystal display (LCD) or as a thin-film transistor (TFT). However, it can also be provided that the display device 7 includes several displays. Thus, for example, an own display 12 can be provided for each camera of the respective camera system 3, 5. The arrangement of the display device 7 in the interior of the motor vehicle 1 is arbitrary provided that a driver of the motor vehicle 1 can perceive the display device 7 during an operation of the motor vehicle 1.

The first camera system 3 includes cameras 13, which are attached to the respective sides of the motor vehicle 1 and substantially capture a rear environmental region 14. The rear environmental region 14 can be situated along the vehicle longitudinal axis substantially behind the motor vehicle 1. Additionally or alternatively, the first camera system 3 can include still further cameras not illustrated further. The cameras 13 have an image angle α, which can for example extend from 30° to 90°.

The second camera system 5 of the environmental capturing device 6 is present in the form of a so-called Surround View System. The second camera system 5 thus presently includes two lateral cameras 15, which are attached to the sides of the motor vehicle 1. Additionally or alternatively, the second camera system 5 includes a rearview camera 16, which is mounted in a rear region or on the rear of the motor vehicle 1. In addition, the camera system 2 can include a front camera 17.

The image opening or the image angle of the cameras 15, 16, 17 of the second camera system 5 is usually between 120° and 220°. In the embodiment according to FIG. 1, this opening angle β is 180° in the horizontal plane. This large image angle β is achieved by a fish eye lens of the respective cameras 15, 16, 17. The fish eye lens images a hemisphere or more to an image plane. Now, the lateral cameras 15 are formed such that they substantially capture an environmental region of the motor vehicle 1 situated at the side of the motor vehicle 1. Furthermore, however, the lateral camera 15 also captures the rear environmental region 14 due to its large image angle β.

The cameras of the first camera system 3 and/or of the second camera system 5 can be a CMOS camera or else a CCD camera or any image capturing device, which can provide an image of the rear environmental region 14. Furthermore, the cameras of the first camera system 3 and/or of the second camera system 5 are video cameras, which continuously provide an image sequence of frames.

In the operation of the driver assistance system 2, the first image sequence of the first camera system 3 is presented on the display device 7 in the motor vehicle 1. The first image sequence 10 shows the rear environmental region 14 of the motor vehicle 1 in order to display to a driver of the motor vehicle 1 a situation behind him on the display device 7. For example, this is helpful if a lane change is to occur during a travel and the driver wants to make sure if a lane is free.

The electronic rearview mirror 4 is used instead of usually used exterior mirrors and/or a rearview mirror. The rear environmental region 14 corresponds to the region outside of the motor vehicle 1, which can else be monitored with the aid of the exterior mirrors and/or the rearview mirror. Usually, the motor vehicle 1 equipped with the electronic rearview mirror 4 is not additionally equipped with conventional exterior mirrors and/or rearview mirror. Thus, it is problematic or a safety risk if a malfunction is present in the electronic rearview mirror 4.

In presence of a malfunction of the electronic rearview mirror 4, now, the image data of the environmental capturing device 6 is used. Thus, if the presence of the malfunction is determined by means of the computing device 8, thus, the second image sequence 11 is displayed on the display device 7 instead of the first image sequence. The display can also only include a partial area 18 of the second image sequence 11. Thus, the driver of the motor vehicle 1 can for example only see the rear environmental region 14 on a screen 12 of the display device 7. Thus, it comes more naturally to him to analyze the second image sequence 11. Furthermore, the partial area 18 can also be transformed such that it is present in undistorted manner. This is often reasonable since the rear environmental region 14 is in an edge area of an image of the lateral camera 15 and severe distortions have to be expected in this edge area.

The malfunction can be determined by means of the computing device 8, wherein a data flow from the first camera system 3 to the display device 7 is checked by the computing device 8. This can be realized by means of a so-called watchdog unit of the computing unit 8. In addition, a display on the display device 7 can be checked with the computing device 8.

Thus, it can be examined if the display changes in the course of time when the motor vehicle 1 moves.

In FIG. 2, now, the non-transformed image of the lateral camera 15 is shown in schematic illustration, which presently corresponds to a frame of the second image sequence 11. It is apparent that substantially a region situated laterally next to the motor vehicle 1 is captured. In this non-transformed image, the complete lateral region next to the motor vehicle is depicted. This region includes at least partially the rear environmental region 14 and also a front environmental region. Furthermore, it is apparent in FIG. 2 that the edge areas of the image have severe distortions by the fish eye lens of the lateral camera 15. Now, FIG. 3 shows in schematic illustration the transformed partial area 18, which has arisen by selection and transformation from FIG. 2. To this, a partial area 18 is selected in the image according to FIG. 2. This partial area 18 can include the rear environmental region 14 at least in certain areas. Furthermore, the selected partial area 18 is correspondingly transformed. For this purpose, the partial area 18 can be processed with the image processing device 9 such that the distortions are compensated for. To this, for example, a corresponding image processing program can be used, which is run on the image processing device 9. The selection of the partial area 18 and the transformation can be effected for each image of the second image sequence 11. The second image sequence 11 is now displayed on the screen 12 of the display device 7.

The computing device 8 can continuously examine the functionality of the electronic rearview mirror 4. From the point of time, from which the computing device 8 determines that the malfunction is no longer present, it is switched back from the second image sequence 11 to the first image sequence. Thus, the first image sequence is presented on the display device 7. Thus, the rear environmental region 14 is again presented on the display 12 of the display device 7 in original quality.

There is also the possibility that the rearview camera 16 is used additionally or alternatively to the lateral camera 15. The second image sequence 11, which is displayed on the display device 7, is now provided by the rearview camera 16. The rearview camera 16 is originally adapted to capture a near region in the rear environmental region 14 and for example assist in a parking maneuver. However, a large area of view, for example due to the fish eye lens, can also be possible with the rearview camera 16. Furthermore, the images of the rearview camera 16 and the images of the front camera 17 can also be fused to provide this information on the display device 7.

The invention claimed is:

1. A method for operating a driver assistance system of a motor vehicle, comprising:
   providing a first image sequence of a first, rear environmental region of the motor vehicle by a first camera system of an electronic rearview mirror;
   displaying the first image sequence on a display device of the electronic rearview mirror disposed in an interior of the motor vehicle;
   providing a second image sequence of a second environmental region of the motor vehicle, which overlaps with the first environmental region at least in certain areas, by a second camera system of an environmental capturing device;
   checking the electronic rearview mirror for presence of a malfunction by a computing device of the driver assistance system; and
   displaying the second image sequence on the display device of the electronic rearview mirror when the malfunction is present,
   wherein the second image sequence is only displayed on the display device during the presence of the malfunction, and otherwise, the first image sequence is again displayed on the display device.

2. The method according to claim 1, wherein a respective image of the second image sequence is transformed by an image processing device of the second camera system such that the second environmental region is presented on the display device in an undistorted manner.

3. The method according to claim 1, wherein a partial area of the respective images of the second image sequence is selected by the image processing device, which substantially corresponds to the first environmental region.

4. The method according to claim 3, wherein the partial area is transformed by the image processing device to be presented on the display device in an undistorted manner.

5. The method according to claim 1, wherein the presence of the malfunction is checked by the computing device by measuring a data flow from the first camera system to the display device.

6. The method according to claim 1, wherein the presence of the malfunction is checked by the computing device at predetermined points of time during an operation of the motor vehicle.

7. The driver assistance system for a motor vehicle comprising:
   a first camera system of an electronic rearview mirror; and
   a second camera system of an environmental capturing device, wherein
   the driver assistance system is configured to perform a method comprising:
      providing a first image sequence of a first, rear environmental region of the motor vehicle by a first camera system of an electronic rearview mirror;
      displaying the first image sequence on a display device of the electronic rearview mirror disposed in an interior of the motor vehicle;
      providing a second image sequence of a second environmental region of the motor vehicle, which overlaps with the first environmental region at least in certain areas, by a second camera system of an environmental capturing device;
      checking the electronic rearview mirror for presence of a malfunction by a computing device of the driver assistance system; and
      displaying the second image sequence on the display device of the electronic rearview mirror when the malfunction is present,
         wherein the second image sequence is only displayed on the display device during the presence of the malfunction, and otherwise, the first image sequence is again displayed on the display device.

8. The driver assistance system according to claim 7, wherein the second camera system includes at least one lateral camera, which is adapted to substantially capture a region situated laterally next to the motor vehicle.

9. The driver assistance system according to claim 8, wherein the at least one lateral camera has a fish eye lens.

10. The driver assistance system according to claim 7, wherein in that the second camera system includes at least one rearview camera, which is adapted to capture substantially a region situated behind the motor vehicle.

11. A motor vehicle with a driver assistance system according to claim 7.

* * * * *